(12) United States Patent
Nakao et al.

(10) Patent No.: US 7,329,981 B2
(45) Date of Patent: Feb. 12, 2008

(54) OPTICAL FILTER AND DISPLAY APPARATUS WITH THE SAME

(75) Inventors: Norihisa Nakao, Tokyo (JP); Daiki Takahashi, Miyagi (JP); Hiroyoshi Fukasawa, Tokyo (JP); Hidemi Matsuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 11/100,444

(22) Filed: Apr. 7, 2005

(65) Prior Publication Data

US 2005/0179357 A1 Aug. 18, 2005

Related U.S. Application Data

(63) Continuation-in-part of application No. PCT/JP03/14805, filed on Nov. 20, 2003.

(30) Foreign Application Priority Data

Nov. 21, 2002 (JP) ............................. 2002-338043

(51) Int. Cl.
  *H01J 29/89* (2006.01)
  *G02B 5/22* (2006.01)

(52) U.S. Cl. ...................... 313/478; 313/112; 359/885; 359/722; 349/835

(58) Field of Classification Search ................ 313/479, 313/112; 349/104–106; 348/832, 835; 359/885, 359, 502, 722, 724

See application file for complete search history.

(56) References Cited

U.S. PATENT DOCUMENTS

| 5,189,337 A | * | 2/1993 | Endo et al. ................. 313/479 |
| 5,632,120 A | * | 5/1997 | Shigematsu et al. .......... 49/449 |
| 5,660,876 A | * | 8/1997 | Kojima et al. ................ 427/64 |
| 6,515,811 B2 | * | 2/2003 | Ikuhara et al. ............... 359/885 |
| 6,888,301 B1 | * | 5/2005 | Namiki et al. ............... 313/489 |

FOREIGN PATENT DOCUMENTS

| CN | 1290956 | 4/2001 |
| CN | 1307354 | 8/2001 |
| EP | 1 089 313 A2 | 4/2001 |
| JP | 2801600 | 12/1989 |
| JP | 11-283530 | 10/1999 |
| KR | 2001-0076956 | 8/2001 |

OTHER PUBLICATIONS

International Search Report for PCT/JP2003/014805, which published as WO 2004/046773.
Chinese Office Action dated Jun. 30, 2006 for Appln. No. 200380100293.0.
Korean Office Action dated Sep. 4, 2006 for Appln. No. 2004-7013413.

* cited by examiner

*Primary Examiner*—Ashok Patel
(74) *Attorney, Agent, or Firm*—Pillsbury Winthrop Shaw Pittman, LLP

(57) ABSTRACT

An optical filter applied to a display apparatus, disposes on a substrate with transparency and has a maximum absorption wavelength $\lambda$ in a wavelength range of 575±20 nm in connection with a wavelength range from 450 to 650 nm. The optical filter satisfies a relationship, $$0.65 \leq T1(\lambda)/T2(\lambda) \leq 0.90$$

where T1 ($\lambda$) is a transmittance at a central part of the substrate at the maximum absorption wavelength $\lambda$, and T2 ($\lambda$) is a transmittance at a peripheral part of the substrate at the maximum absorption wavelength $\lambda$. The optical filter also satisfies a relationship, $$0.90 \leq (T1(\lambda 1)/T2(\lambda 1))/(T1(\lambda)/T2(\lambda)) \leq 1.05$$

with respect to transmittances wherein $\lambda 1$ is each wavelength 450 nm, 530 nm and 630 nm, and $\lambda$ is the maximum absorption wavelength.

7 Claims, 3 Drawing Sheets

OPTICAL FILTER AND DISPLAY APPARATUS WITH THE SAME

CROSS REFERENCE TO RELATED APPLICATIONS

This is a Continuation-in-Part Application of PCT Application No. PCT/JP03/14805, filed Nov. 20, 2003, which was published under PCT Article 21(2) in Japanese.

This application is based upon and claims the benefit of priority from prior Japanese Patent Application No. 2002-338043, filed Nov. 21, 2002, the entire contents of which are incorporated herein by reference.

BACKGROUND OF THE INVENTION

1. Field of the Invention

The present invention relates to an optical filter and a display apparatus having the optical filter, and more particularly to an optical filter that is disposed on an outer surface of a face panel of a display apparatus such as a cathode-ray tube.

2. Description of the Related Art

As regards a cathode-ray tube that is typical as a display apparatus, Japanese Patent No. 2801600, for instance, discloses an optical filter by which the ratio in transmittance at a specified wavelength (e.g. 450 nm, 530 nm, 550 nm or 630 nm) can be set within a predetermined range, thereby to improve the contrast.

In general terms, in a cathode-ray tube, the inside of a vacuum envelope is kept in a high-vacuum state, and a compression stress and a tensile stress occurs in the vacuum envelope. If a mechanical shock acts on the vacuum envelope, there is a danger of implosion. To cope with this, the face panel of the vacuum envelope is formed to have a greater thickness at the peripheral part than at the central part, thereby to secure a sufficient mechanical strength for the cathode-ray tube.

In recent years, there has been an increasing demand for the flattening of the face panel. In order to secure the mechanical strength of the face panel, a difference in thickness between the peripheral part and the central part has been made still greater. With this face panel, the transmittance of the central part is high and that of the peripheral part is considerably low. As the difference in transmittance increases, non-uniformity in luminance tends to become visible, leading to a degradation in display image. In the prior art as disclosed in the above-mentioned Japanese Patent No. 2801600, no adequate consideration is given to the difference in transmittance due to the difference in thickness of the face panel.

Jpn. Pat. Appln. KOKAI Publication No. 11-283530, for instance, proposes a gradation coating method that aims at correcting such a difference in transmittance. In this method, the outer surface of the face panel is coated with a color film having a high transmittance at a part corresponding to a thick part of the face panel and a low transmittance at a part corresponding to a thin part of the face panel.

With this method, however, it is difficult to obtain a sufficient contact characteristic. There is known a method using BCP as an index for evaluating an improvement in the contrast characteristic. BCP is expressed by $$BCP = \Delta B / \sqrt{\Delta Rf}$$

where ΔB is the ratio of a decrease in luminance of a cathode-ray tube to be evaluated, relative to the luminance of a cathode-ray tube serving as a reference, and ΔRf is the ratio of a decrease in external light reflectance of the cathode-ray tube to be evaluated, relative to the external light reflectance of the reference cathode-ray tube. The BCP corresponds to a contrast improvement ratio in a case of considering, as a reference, a cathode-ray tube that includes a neutral filter having no maximum absorptance at a specified wavelength, that is, having a substantially constant transmittance to visible-region light.

In the cathode-ray tube having the neutral filter layer, the BCP is about 1.0 regardless of the transmittance, and an improvement in contrast is inadequate. In a cathode-ray tube with a light-selective absorption filter layer that has a maximum absorptance at a specified wavelength, the BCP deteriorates as the transmittance increases. In other words, a degradation in contrast is conspicuous. In the case of the cathode-ray tube with such a light-selective absorption filter layer, if the transmittance excessively decreases, the BCP can be improved and the contrast enhanced. However, with the effect of a component included in the light-selective absorption filter layer, such as neodymium oxide, which has a principal absorption band at a long wavelength, the filter color of the light-selective absorption filter layer itself varies due to external light. In particular, under an incandescent lamp, the film color of the light-selective absorption filter layer becomes red. Consequently, if the gradation coating method is applied, a display image becomes locally reddish and the display quality may deteriorate.

BRIEF SUMMARY OF THE INVENTION

The present invention has been made to solve the above problems, and the object of the invention is to provide an optical filter capable of displaying a high-quality image with a uniform luminance over the entire screen, and a display apparatus with the optical filter.

According to a first aspect of the invention, there is provided an optical filter disposed on a substrate with transparency and having a maximum absorption wavelength (λ) in a wavelength range of 575±20 nm in connection with a wavelength range from 450 to 650 nm, wherein the optical filter is configured to satisfy a relationship, $$0.65 \leq T1(\lambda)/T2(\lambda) \leq 0.90$$

where T1 (λ) is a transmittance at a central part of the substrate at the maximum absorption wavelength λ, and T2 (λ) is a transmittance at a peripheral part of the substrate at the maximum absorption wavelength λ, and the optical filter is configured to satisfy a relationship, $$0.90 \leq (T1(\lambda 1)/T2(\lambda 1))/(T1(\lambda)/T2(\lambda)) \leq 1.05$$

with respect to transmittances at wavelengths λ1 and λ, wherein λ1 is each wavelength of 450 nm, 530 nm and 630 nm and λ is the maximum absorption wavelength.

According to a second aspect of the invention, 20 there is provided a display apparatus with an optical filter disposed on a display screen that displays an image, wherein the optical filter has a maximum absorption wavelength λ in a wavelength range of 575±20 nm in connection with a wavelength range from 450 to 650 nm, the optical filter is configured to satisfy a relationship, $$0.65 \leq T1(\lambda)/T2(\lambda) \leq 0.90$$

where T1 (λ) is a transmittance at a central part of the display screen at the maximum absorption wavelength λ, and T2 (λ) is a transmittance at a peripheral part of the display screen at the maximum absorption wavelength λ, and the optical filter is configured to satisfy a relationship, $$0.90 \leq (T1(\lambda 1)/T2(\lambda 1))/(T1(\lambda)/T2(\lambda)) \leq 1.05$$

with respect to transmittances at wavelengths λ1 and λ, wherein λ1 is each wavelength of 450 nm, 530 nm and 630 nm and λ is the maximum absorption wavelength.

DETAILED DESCRIPTION OF THE INVENTION

An optical filter according to an embodiment of the present invention and a display apparatus having the optical filter will now be described with reference to the accompanying drawings.

Figure 1:
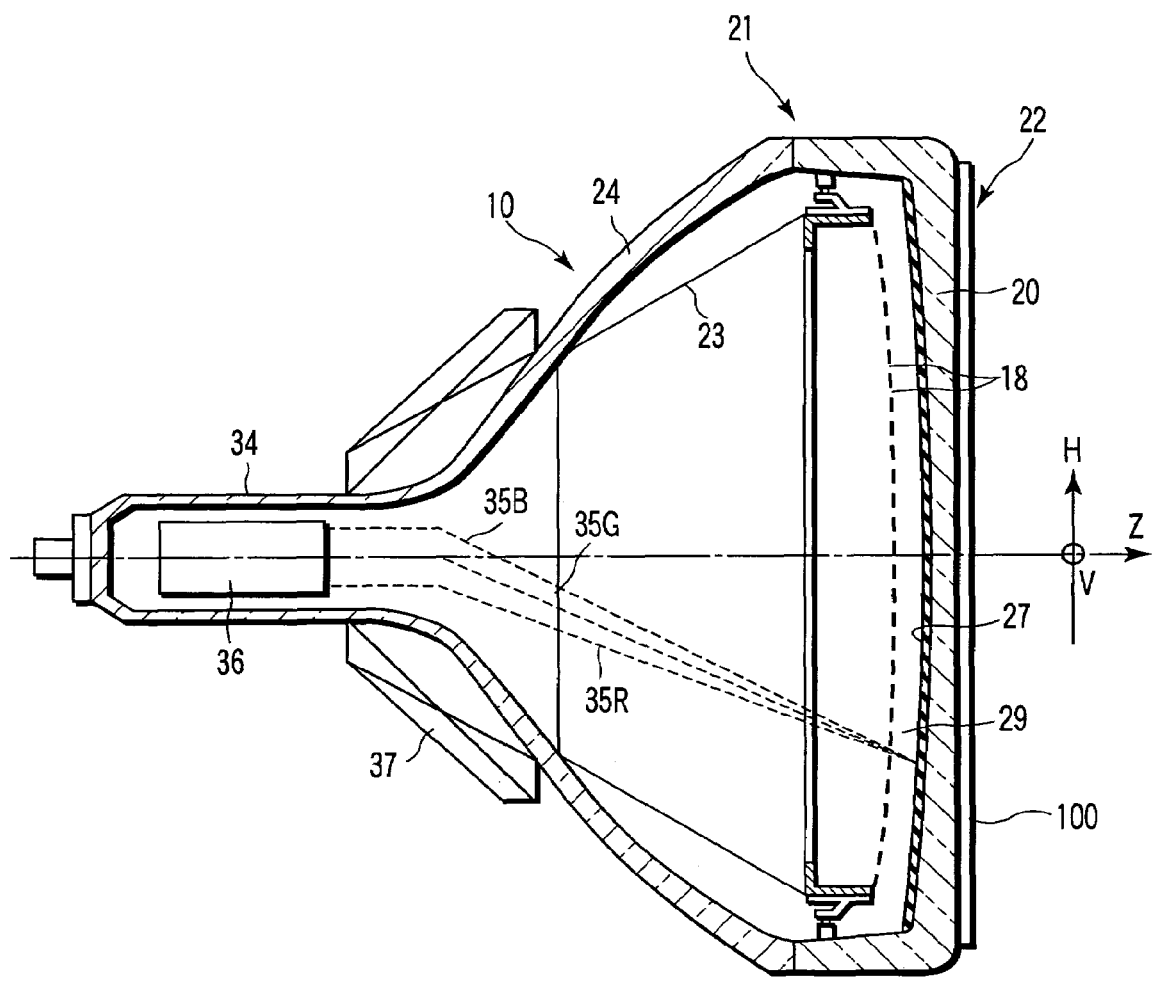
FIG. 1 is a horizontal cross-sectional view that schematically shows the structure of a color cathode-ray tube apparatus according to an embodiment of the present invention.

As is shown in FIG. 1, a color cathode-ray tube apparatus according to the display apparatus of the embodiment includes a vacuum envelope 10 that is formed of glass. The vacuum envelope 10 includes a substantially rectangular face panel 22 and a funnel 24 that is integrally coupled to the face panel 22. The face panel 22 includes a substantially rectangular effective portion 20 and a skirt portion 21 that extends in a direction of a tube axis Z from a peripheral part of the effective portion 20. The outer surface of the effective portion 20 is formed substantially flat. The inner surface of the effective portion 20 is formed of a desired curved surface.

A phosphor screen 27 is provided on the inner surface of the effective portion 20 of face panel 22. The phosphor screen 27 includes dot-shaped or stripe-shaped three-color phosphor layers, which emit red, green and blue light, and light-absorption layers, which are provided between the three-color phosphor layers.

An electron gun assembly 36 is disposed within a cylindrical neck 34 that corresponds to a small-diameter part of the funnel 24. The electron gun assembly 36 emits three electron beams 35R, 35G and 35B, which are arranged in line in a direction of a horizontal axis H, toward the phosphor screen 27. The electron gun assembly 36 is disposed substantially coaxial with the tube axis Z that passes through the center of the effective portion 20 of the face panel 22 and extends substantially perpendicular to the face panel 22.

A shadow mask 29 having a color selection function is disposed to face the phosphor screen 27 within the vacuum envelope 10. The shadow mask 29 has a plurality of slit-like openings 18 for passing the three electron beams 35R, 35G and 35B that are emitted from the electron gun assembly 36.

A deflection yoke 37 is disposed an outer surface of the funnel 24, which extends from a large-diameter part of the funnel 24 to the neck 34. The deflection yoke 37 generates non-uniform deflection magnetic fields that deflect the three electron beams 35R, 35G and 35B, which are emitted from the electron gun assembly 36, in the direction of horizontal axis H and the direction of vertical axis V.

In the color cathode-ray tube apparatus with the above-described structure, the three electron beams 35R, 35G and 35B that are emitted from the electron gun assembly 36 are deflected by the deflection magnetic fields that are generated by the deflection yoke 37, while they are being converged near the openings 18 in the shadow mask 29.

Thereby, the three electron beams 35R, 35G and 35B are scanned over the phosphor screen 27 in the direction of horizontal axis H and direction of vertical axis V via the shadow mask 29. At this time, the respective electron beams 35R, 35G and 35B are shaped and caused to land on specific color phosphor layers, and thus a color image is displayed.

Figure 2:
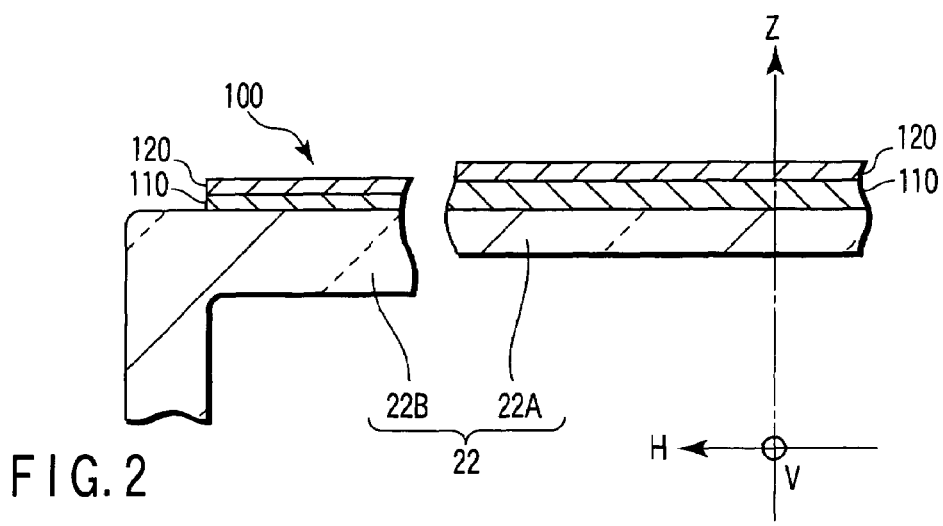
FIG. 2 is a cross-sectional view that schematically shows a structure of an optical filter according to the embodiment of the invention.

In the above-described color cathode-ray tube apparatus, an optical filter 100 is disposed on a display screen for displaying an image, that is, on the outer surface of the face panel 22. As is shown in FIG. 2, in a case where the optical filter 100 is directly disposed on the face panel 22 of the cathode-ray tube apparatus, the face panel 22 itself functions as a substrate having transparency.

Figure 3:
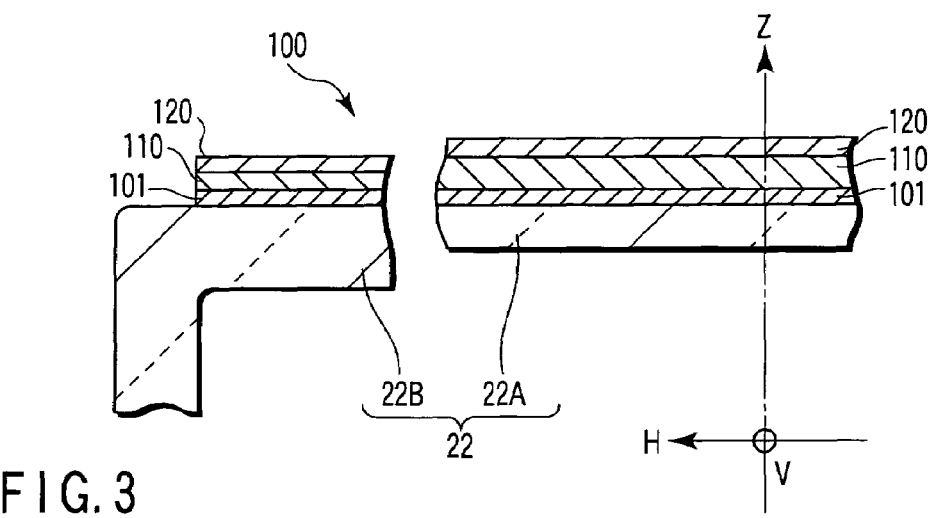
FIG. 3 is a cross-sectional view that schematically shows another structure of an optical filter according to the embodiment of the invention.

As is shown in FIG. 3, the optical filter 100 may include, as a support member 101, a film or a sheet that is formed of a transparent high-polymer material or a glass material such as polyethylene terephthalate (PET). In this case, the optical filter 100 including the support member 101 is disposed on the face panel 22 as a substrate having transparency.

The optical filter 100 has a maximum absorption wavelength in a wavelength range of 575±20 nm in connection with a wavelength range from 450 to 650 nm. The specified wavelength with the maximum absorptance is referred to as a maximum absorption wavelength. The optical filter 100 is configured to satisfy a relationship, $$0.65 \leq T1(\lambda)/T2(\lambda) \leq 0.90$$

where T1 (λ) is the transmittance at a central part of the display screen at the maximum absorption wavelength λ, and T2 (λ) is the transmittance at a peripheral part of the display screen at the maximum absorption wavelength λ.

In addition, the optical filter 100 is configured to satisfy a relationship, $$0.90 \leq (T1(\lambda 1)/T2(\lambda 1))/(T1(\lambda)/T2(\lambda)) \leq 1.05$$

with respect to transmittances at given two wavelengths λ1 and λ, wherein λ1 is each wavelength 450 nm, 530 nm and 630 nm and λ is the maximum absorption wavelength.

With this optical filter 100, the transmittance at the central part of the display screen and the transmittance at the peripheral part of the display screen can be controlled. The transmittance at the central part is decreased to enhance the contrast, and the transmittance at the peripheral part is increased to such a degree that the contrast may not deteriorate. Thereby, the optical filter 100 has such transmittance characteristics that the transmittance at the central part is lower than that at the peripheral part.

It is preferable that the ratio, $T1\ (\lambda)/T2\ (\lambda)$, of the transmittance $T1\ (\lambda)$ at the central part at the maximum absorption wavelength $(\lambda)$ to the transmittance $T2\ (\lambda)$ at the peripheral part at the maximum absorption wavelength $(\lambda)$ be 65% or more and 90% or less. In addition, it is preferable that the transmission ratio, $(T1\ (\lambda 1)/T2\ (\lambda 1))/(T1\ (\lambda)/T2\ (\lambda))$, at wavelengths $\lambda 1$ (=450 nm, 530 nm and 630 nm) and $\lambda$ (=the maximum absorption wavelength) be 90% or more and 105% or less. More preferably, this transmission ratio should be substantially 100%.

With the application of the optical filter 100 having the aforementioned transmittance characteristics, a uniform transmittance can be obtained over the entire display screen of the display apparatus, and a high-quality image can be displayed.

Next, an example of the specific structure of the optical filter 100 is described.

As is shown in FIG. 2, the optical filter 100 that is directly disposed on the face panel 22 includes a neutral filter layer 110 and a light-selective absorption filter layer 120. The neutral filter layer 110 has no maximum absorptance, that is, having a substantially constant transmittance to visible-region light. The light-selective absorption filter layer 120 has a maximum absorptance in a wavelength range of 575±20 nm in connection with a wavelength range from 450 to 650 nm.

The neutral filter layer 110 is formed of, e.g. a resin material. Since the transmittance of the neutral filter layer 110 does not affect the BCP characteristics, the neutral filter layer 110 is formed to have a transmittance that increases from the central part toward the peripheral part. For example, as shown in FIG. 2, the neutral filter layer 110 is formed to have a less thickness at a peripheral part 22B of the face panel than at a central part 22A of the face panel. Thereby, it is possible to correct non-uniformity in luminance due to a difference in transmittance that results from a difference in thickness between the central part 22A and peripheral part 22B of the face panel 22.

The light-selective absorption filter layer 120 is formed of, e.g. a resin material. The light-selective absorption filter layer 120 is so formed as to have uniform transmittance characteristics over the entire surface. For example, as shown in FIG. 2, the light-selective absorption filter layer 120 is formed to have a uniform thickness over the entire surface. Although the body color of the entire surface may become uniformly reddish, the BCP characteristics become uniform over the entire surface and a high display quality can be provided.

In addition, as shown in FIG. 3, the optical filter including the transparent support member 101 has a similar structure with the optical filter 100 shown in FIG. 2, and has similar advantages.

The optical filter 100 is formed by successively coating liquid-phase neutral filter material and a light-selective absorption filter material. Specifically, the neutral filter layer 110 and light-selective absorption filter layer 120 of the optical filter 100 are coated by a spin coat method or a spray coat method.

In the case of forming the neutral filter layer 110 with a distribution in thickness by the spin coat method, such a temperature distribution is provided that the central part of the substrate has a higher temperature than the peripheral part thereof. Then, the neutral filter material is coated. Thereby, the thickness of the central part can be made greater than that of the peripheral part. In the case of forming the light-selective absorption filter layer 120, the substrate is made to have a uniform temperature distribution over the entire surface. Then, the light-selective absorption filter material is coated. Thereby, a substantially uniform film thickness is obtained.

On the other hand, in the case of forming the neutral filter layer 110 with a distribution in thickness by the spray coat method, when the neutral filter material is to be coated, a relative distance between a spray nozzle and the substrate is varied (i.e. the spray nozzle is moved along such a locus that the distance at the central part may be less than the distance at the peripheral part). Alternatively, a relative speed of movement between the spray nozzle and the substrate is varied (i.e. the spray nozzle is moved so that the speed of movement at the central part may be lower than the speed of movement at the peripheral part). Thereby, the thickness of the central part can be made greater than that of the peripheral part. In the case of forming the light-selective absorption filter layer 120, when the light-selective filter material is to be coated, a relative distance between the spray nozzle and the substrate is kept constant or a relative speed between the spray nozzle and substrate is kept constant. Thereby, a substantially uniform film thickness is obtained.

In the example of FIG. 2 and FIG. 3, the film thickness of the peripheral part of the neutral filter layer 110 is made less than that of the central part thereof so that the transmittance may increase from the central part toward the peripheral part. However, the structure of the neutral filter layer 110 is not limited to this example since the transmittance does not depend on only the film thickness.

In addition, in the example of FIGS. 2 and 3, although the neutral filter layer 110 is disposed on the substrate or the support member and the light-selective absorption filter layer 120 is stacked on the neutral filter layer 110, the order of stacking of layers is not limited to this example. In order to improve the BCP characteristics, however, it is preferable to dispose the light-selective absorption filter layer on the surface side. The number of layers of the optical filter 100 is not limited to two, and it may be three or more.

Besides, at least one of the neutral filter layer 110 and light-selective absorption filter layer 120 may include electrically conductive particles. This prevents charging of the optical filter 100 on the surface of the face panel 22. Furthermore, by setting the resistance value of the optical filter 100 at $10^3\ \Omega$ or less, electromagnetic waves that are emitted through the face panel 22 can be reduced.

Next, measurement results of spectral transmittances of the optical filter 100 with the above-described structure are described. Assume that in the description below, the central part corresponds to a geometrical center of the optical filter and the peripheral part corresponds to a corner part that is farthest from the central part.

Figure 4:
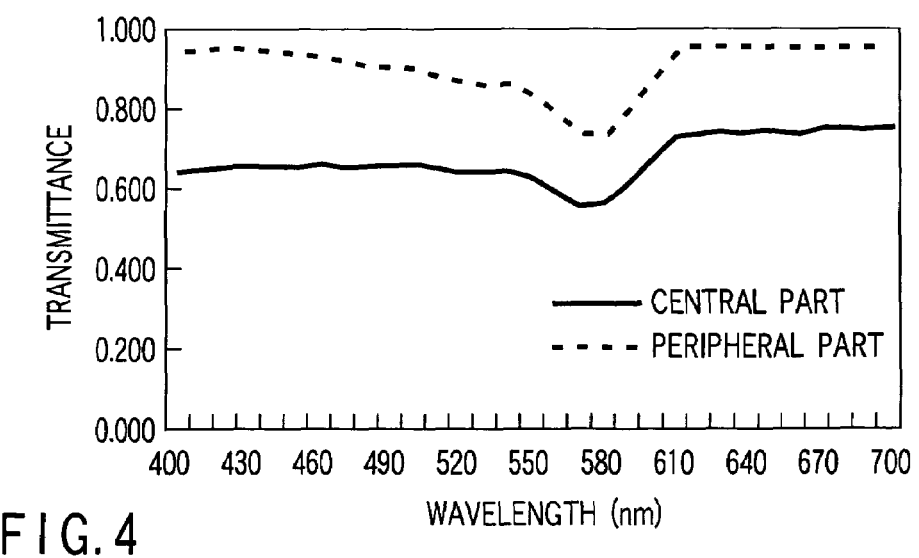
FIG. 4 is a graph showing spectral transmittances at a central part and a peripheral part of the optical filter shown in FIG. 2.

In FIG. 4, the optical filter 100 with the above-described structure includes the light-selective absorption filter layer 120 having a uniform film thickness over the entire surface. Consequently, the entire surface becomes reddish over the entire surface, but the spectral transmittances of the central part and peripheral part have little differences at a maximum absorption wavelength and have substantially equal distributions, although the absolute values are different. In short, the optical filter 100 satisfies the relationship, $$0.90 \leq (T1(\lambda 1)/T2(\lambda 1))/(T1(\lambda)/T2(\lambda)) \leq 1.05$$

with respect to transmittances at wavelengths λ1 (=450 nm, 530 nm and 630 nm) and λ2 (=the maximum absorption wavelength).

In the example of FIG. 4, the ratio in transmittance, T1 (λ)/T2 (λ), of the central part to the peripheral part at the maximum absorption wavelength λ is about 0.65. If this transmittance ratio, T1 (λ)/T2 (λ), decreases below 0.65, the luminance at the central part excessively decreases and the entire screen looks dark. On the other hand, if the transmittance ratio, T1 (λ)/T2 (λ), exceeds 0.90, the difference in transmittance between the central part and the peripheral part cannot fully be corrected. Therefore, it is preferable that the transmittance ratio, T1 (λ)/T2 (λ), be 0.65 or more and 0.90 or less.

Figure 5:
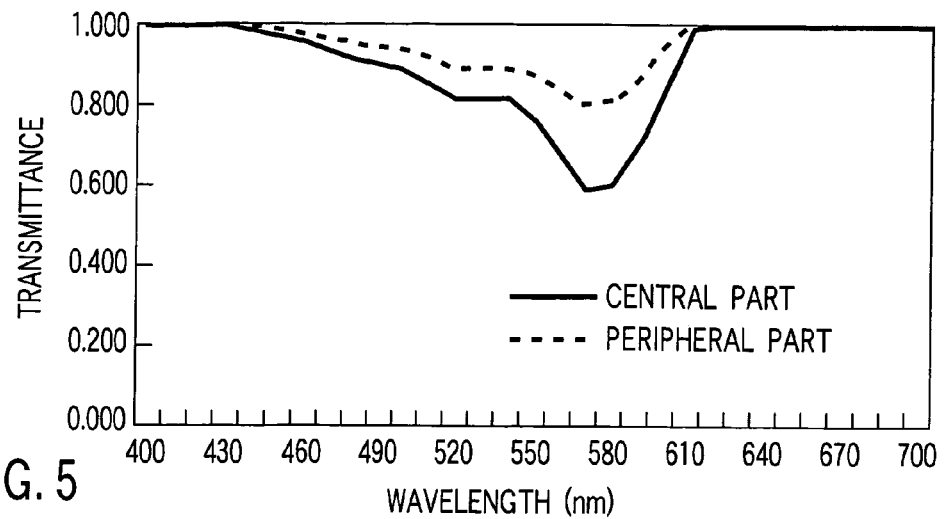
FIG. 5 is a graph showing spectral transmittances at the central part and the peripheral part in a case where only a light-selective absorption filter layer is gradation-coated.

FIG. 5 shows spectral transmittances in a case where the optical filter is configured such that transmittance may increase from the central part toward the peripheral part using the light-selective absorption filter layer alone. Specifically, by virtue of the gradation coating of the light-selective absorption filter layer, the transmittance ratio, T1 (λ)/T2 (λ), become about 0.75. However, the spectral transmittances of the central part and peripheral part are different. In other words, the central part becomes reddish, and the reddish color becomes thinner toward the peripheral part. This leads to a difference in body color and unnaturalness. Besides, the BCP characteristics do not become uniform over the entire surface, and the display quality deteriorates.

Figure 6:
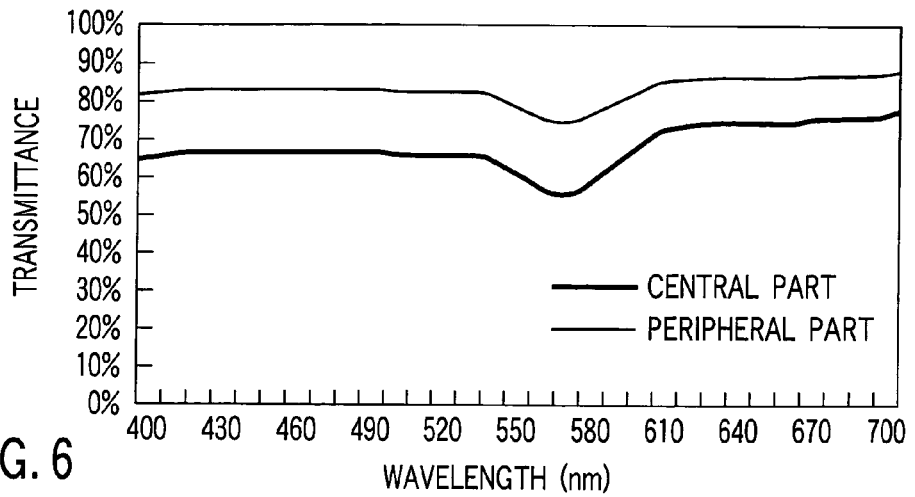
FIG. 6 is a graph showing spectral transmittances at the central part and the peripheral part in a case where a mixture of a neutral filter material and a light-selective absorption filter material is gradation-coated.

FIG. 6 shows spectral transmittances in a case where the optical filter is configured such that transmittance may increase from the central part toward the peripheral part using a mixture of a neutral filter material and a light-selective absorption filter material. Specifically, by virtue of the gradation coating of the neutral filter layer with the transmittance correction effect, the transmittance ratio, T1 (λ)/T2 (λ), becomes about 0.75, and the difference in transmittance at the time the filter is disposed on the display screen can be corrected. However, a difference in spectral transmittance between the central part and peripheral part occurs. In other words, a difference in BCP and body color occurs between the central part and peripheral part, lacking uniformity of contrast property and leading to unnaturalness. Consequently, the display quality deteriorates.

Figure 7:
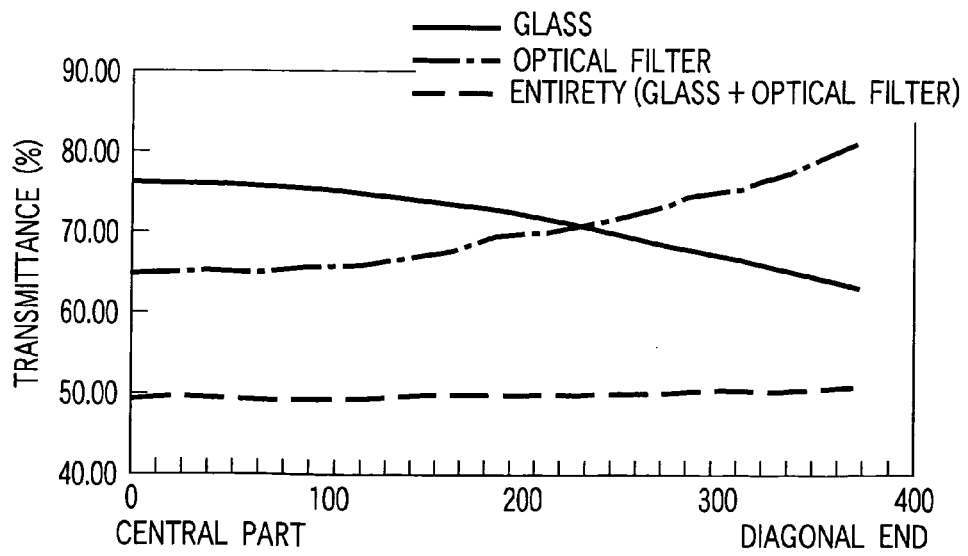
FIG. 7 is a graph showing a transmittance distribution from the central part toward the peripheral part in a case where the cathode-ray tube is combined with the optical filter according to the embodiment of the invention.

As has been described above, the optical filter with the above-described structure is configured such that the transmittance thereof increases from the central part toward the peripheral part, as shown in FIG. 7 (dot-and-dash line). In the cathode-ray tube that serves as a display apparatus and has a thicker glass thickness at the peripheral part than at the central part, the transmittance of the central part is higher than that of the peripheral part (solid line). If the cathode-ray tube with the difference in transmittance is combined with the above-described optical filter, the transmittances of the central part and peripheral part can be equalized, as shown in FIG. 7 (broken line). Thus, the luminance can be made uniform over the entire screen. Moreover, the entire surface of the optical filter has a uniform body color and the entire screen can have good BCP characteristics.

The present invention is not limited to the above-described embodiments. At the stage of practicing the invention, various modifications and alterations may be made without departing from the spirit of the invention. In the above-described embodiment, the cathode-ray tube apparatus is employed as an example of the display apparatus. This invention, however, is applicable to any display apparatus that has different luminance distributions at the peripheral part and central part. For example, this invention is applicable to a liquid crystal display. The embodiments may properly be combined and practiced, if possible. In this case, advantages are obtained by the combinations.

As has been described above, the present invention can provide an optical filter capable of displaying a high-quality image with a uniform luminance over the entire screen, and a display apparatus with the optical filter.

What is claimed is:

1. An optical filter disposed on a substrate with transparency and having a maximum absorption wavelength (λ) in a wavelength range of 575±20 nm in connection with a wavelength range from 450 to 650 nm, wherein the optical filter is configured to satisfy a relationship, $$0.65 \leq T1(\lambda)/T2(\lambda) \leq 0.90$$

where T1 (λ) is a transmittance at a central part of the substrate at said maximum absorption wavelength λ, and T2 (λ) is a transmittance at a peripheral part of the substrate at said maximum absorption wavelength λ, and the optical filter is configured to satisfy a relationship, $$0.90 \leq (T1(\lambda 1)/T2(\lambda 1))/(T1(\lambda)/T2(\lambda)) \leq 1.05$$

with respect to transmittances at wavelengths λ1 and λ, wherein λ1 is each wavelength of 450 nm, 530 nm and 630 nm and λ is said maximum absorption wavelength.

2. The optical filter according to claim 1, wherein the optical filter includes a support member formed of a glass material or a high-polymer material, which has transparency.

3. The optical filter according to claim 1, wherein the optical filter has a stacked structure on the substrate, the stacked structure including a light-selective absorption filter layer having a maximum absorptance at the specified wavelength, and a neutral filter layer having a substantially constant transmittance in the wavelength range of 450-650 nm.

4. The optical filter according to claim 3, wherein the neutral filter layer has a less film thickness at the peripheral part of the substrate than at the central part of the substrate.

5. A display apparatus with an optical filter disposed on a display screen that displays an image, wherein the optical filter has a maximum absorption wavelength λ in a wavelength range of 575±20 nm in connection with a wavelength range from 450 to 650 nm, the optical filter is configured to satisfy a relationship, $$0.65 \leq T1(\lambda)/T2(\lambda) \leq 0.90$$

where T1 (λ) is a transmittance at a central part of the display screen at the maximum absorption wavelength λ, and T2 (λ) is a transmittance at a peripheral part of the display screen at the maximum absorption wavelength λ, and the optical filter is configured to satisfy a relationship, $$0.90 \leq (T1(\lambda 1)/T2(\lambda 1))/(T1(\lambda)/T2(\lambda)) \leq 1.05$$

with respect to transmittances at wavelengths λ1 and λ, wherein λ1 is each wavelength of 450 nm, 530 nm and 630 nm and λ is said maximum absorption wavelength.

6. The display apparatus according to claim 5, wherein the optical filter is disposed on an outer surface of a face panel that is formed of glass, the face panel having a phosphor screen on an inner surface thereof.

7. The display apparatus according to claim 6, wherein the outer surface of the face panel is substantially flat.

* * * * *